(12) United States Patent (10) Patent No.: US 8,161,125 B2
Pearson et al. (45) Date of Patent: *Apr. 17, 2012

(54) MESSAGE DATA MANAGEMENT

(75) Inventors: Malcolm Erik Pearson, Kirkland, WA (US); Leon R. Warman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,418

(22) Filed: Apr. 5, 2011

(65) Prior Publication Data

US 2011/0185027 A1 Jul. 28, 2011

Related U.S. Application Data

(63) Continuation of application No. 11/354,368, filed on Feb. 15, 2006, now Pat. No. 7,941,492, which is a continuation-in-part of application No. 10/867,626, filed on Jun. 15, 2004, now Pat. No. 7,496,500.

(60) Provisional application No. 60/549,075, filed on Mar. 1, 2004.

(51) Int. Cl.
*G06F 15/16* (2006.01)

(52) U.S. Cl. ......... 709/206; 709/207; 709/223; 709/224

(58) Field of Classification Search .................. 709/206, 709/207, 223–224
See application file for complete search history.

(56) References Cited

U.S. PATENT DOCUMENTS

| 3,898,623 | A | 8/1975 | Cormier |
| 4,402,046 | A | 8/1983 | Cox et al. |
| 5,872,930 | A | 2/1999 | Masters et al. |
| 6,208,720 | B1 | 3/2001 | Curtis et al. |
| 6,233,537 | B1 | 5/2001 | Gryphon et al. |
| 6,336,135 | B1 | 1/2002 | Niblett et al. |
| 6,397,192 | B1 | 5/2002 | Notani et al. |
| 6,442,546 | B1 * | 8/2002 | Biliris et al. ........................ 1/1 |
| 6,446,115 | B2 | 9/2002 | Powers |
| 6,484,196 | B1 * | 11/2002 | Maurille ....................... 709/206 |

(Continued)

FOREIGN PATENT DOCUMENTS

WO 01/24037 A2 4/2001

(Continued)

OTHER PUBLICATIONS

Sun Microsystems, Chapter 5 Deployment Design, Online, Feb. 2005, Retrieved Jul. 2009, http://web.archive.org/web20050219003745/http://docs.sun.com/source/819-0058/dep_architect.html, pp. 1-22.

(Continued)

*Primary Examiner* — Emmanuel L Moise
*Assistant Examiner* — Waseem Ashraf
(74) *Attorney, Agent, or Firm* — Senniger Powers LLP

(57) ABSTRACT

A workflow manager application transfers message data received from an originating device via a communication network to a target application for processing. A graphical user interface displays the received message data and allows the user to view and designate one or more target applications for processing the message data. The workflow manger application is responsive to user input to transfer message data to the designated one or more target applications for processing the message data. Alternatively, the workflow manager application analyzes received message data to identify one or more target applications, and transfers the message data to the identified one or more target applications for processing.

15 Claims, 11 Drawing Sheets

U.S. PATENT DOCUMENTS

| | | | |
|---|---|---|---|
| 6,493,696 B1* | 12/2002 | Chazin | 706/47 |
| 6,505,167 B1* | 1/2003 | Horvitz et al. | 705/7.21 |
| 6,601,084 B1 | 7/2003 | Bhaskaran et al. | |
| 6,628,935 B1 | 9/2003 | Lawrence | |
| 6,678,828 B1 | 1/2004 | Zhang et al. | |
| 6,704,772 B1 | 3/2004 | Ahmed et al. | |
| 6,760,420 B2 | 7/2004 | Heilmann et al. | |
| 6,931,532 B1 | 8/2005 | Davis et al. | |
| 6,941,459 B1 | 9/2005 | Hind et al. | |
| 6,961,849 B1 | 11/2005 | Davis et al. | |
| 6,978,367 B1 | 12/2005 | Hind et al. | |
| 7,113,979 B1* | 9/2006 | Smith et al. | 709/217 |
| 7,155,483 B1 | 12/2006 | Friend et al. | |
| 7,181,017 B1 | 2/2007 | Nagel et al. | |
| 7,249,175 B1 | 7/2007 | Donaldson | |
| 7,340,438 B2 | 3/2008 | Nordman et al. | |
| 7,395,314 B2 | 7/2008 | Smith et al. | |
| 7,412,260 B2* | 8/2008 | Gailey et al. | 455/563 |
| 7,522,908 B2 | 4/2009 | Hrastar | |
| 7,650,325 B2* | 1/2010 | Bader et al. | 719/311 |
| 7,660,897 B2 | 2/2010 | Hall, Jr. et al. | |
| 2001/0032245 A1 | 10/2001 | Fodor | |
| 2002/0032692 A1 | 3/2002 | Suzuki et al. | |
| 2002/0048369 A1 | 4/2002 | Ginter et al. | |
| 2002/0087646 A1 | 7/2002 | Hickey et al. | |
| 2002/0099816 A1 | 7/2002 | Quarterman et al. | |
| 2002/0120711 A1 | 8/2002 | Bantz et al. | |
| 2002/0133374 A1* | 9/2002 | Agoni et al. | 705/2 |
| 2002/0159387 A1* | 10/2002 | Allison et al. | 370/229 |
| 2002/0162047 A1 | 10/2002 | Peters et al. | |
| 2002/0170035 A1 | 11/2002 | Casati et al. | |
| 2002/0194335 A1 | 12/2002 | Maynard | |
| 2003/0041050 A1 | 2/2003 | Smith et al. | |
| 2003/0055668 A1 | 3/2003 | Saran et al. | |
| 2003/0059030 A1 | 3/2003 | Tenorio | |
| 2003/0061265 A1 | 3/2003 | Maso et al. | |
| 2003/0105827 A1* | 6/2003 | Tan et al. | 709/206 |
| 2003/0110307 A1* | 6/2003 | De Armas et al. | 709/310 |
| 2003/0115272 A1 | 6/2003 | Muttitt et al. | |
| 2003/0135554 A1 | 7/2003 | Bellotti et al. | |
| 2003/0145057 A1 | 7/2003 | Throop | |
| 2003/0149888 A1 | 8/2003 | Yadav | |
| 2003/0177194 A1 | 9/2003 | Crocker et al. | |
| 2003/0187743 A1 | 10/2003 | Kumaran et al. | |
| 2003/0191865 A1* | 10/2003 | De Armas et al. | 709/310 |
| 2003/0195984 A1 | 10/2003 | Zisapel et al. | |
| 2003/0196116 A1 | 10/2003 | Troutman | |
| 2003/0231647 A1* | 12/2003 | Petrovykh | 370/429 |
| 2004/0153512 A1* | 8/2004 | Friend | 709/206 |
| 2004/0156487 A1* | 8/2004 | Ushiki et al. | 379/88.22 |
| 2004/0167965 A1 | 8/2004 | Addante et al. | |
| 2004/0186894 A1 | 9/2004 | Jhingan et al. | |
| 2004/0260756 A1* | 12/2004 | Forstall et al. | 709/200 |
| 2004/0260780 A1* | 12/2004 | Eisen | 709/207 |
| 2005/0015484 A1 | 1/2005 | Brazdrum et al. | |
| 2005/0044151 A1 | 2/2005 | Jiang et al. | |
| 2005/0076049 A1 | 4/2005 | Qubti et al. | |
| 2005/0076084 A1* | 4/2005 | Loughmiller et al. | 709/206 |
| 2005/0091323 A1 | 4/2005 | Smith et al. | |
| 2005/0192822 A1 | 9/2005 | Hartenstein et al. | |
| 2005/0256931 A1 | 11/2005 | Follmeg et al. | |
| 2005/0278620 A1 | 12/2005 | Baldwin et al. | |
| 2006/0069776 A1 | 3/2006 | Shim et al. | |
| 2006/0080389 A1 | 4/2006 | Powers et al. | |
| 2006/0089128 A1 | 4/2006 | Smith et al. | |
| 2006/0106938 A1 | 5/2006 | Dini et al. | |
| 2006/0182034 A1 | 8/2006 | Klinker et al. | |
| 2006/0271927 A1 | 11/2006 | Morales et al. | |
| 2007/0067394 A1 | 3/2007 | Adams et al. | |
| 2007/0100701 A1 | 5/2007 | Boccon-Gibod et al. | |
| 2007/0156869 A1 | 7/2007 | Galchev et al. | |
| 2007/0168336 A1 | 7/2007 | Ransil et al. | |
| 2007/0177731 A1 | 8/2007 | Spies et al. | |
| 2008/0005293 A1 | 1/2008 | Bhargava et al. | |
| 2008/0060080 A1 | 3/2008 | Lim | |
| 2008/0320486 A1 | 12/2008 | Bose et al. | |
| 2010/0082787 A1 | 4/2010 | Kommula et al. | |

FOREIGN PATENT DOCUMENTS

| | | |
|---|---|---|
| WO | 01/65414 A2 | 9/2001 |
| WO | 02/03243 A1 | 1/2002 |
| WO | 02/084520 A1 | 10/2002 |
| WO | 2005/072251 A2 | 8/2005 |

OTHER PUBLICATIONS

IBM, "IBM Workplace Web Content Management", http://www.lotus.com/products/product5.nsf/wdocs/homepage, 2 pgs., printed Oct. 28, 2005.

Zoteca, "Zoteca Back End (ZBE)", http://www.zoteca.com/information/wp/zbefull.pdf, 8 pgs., Feb. 2002.

* cited by examiner

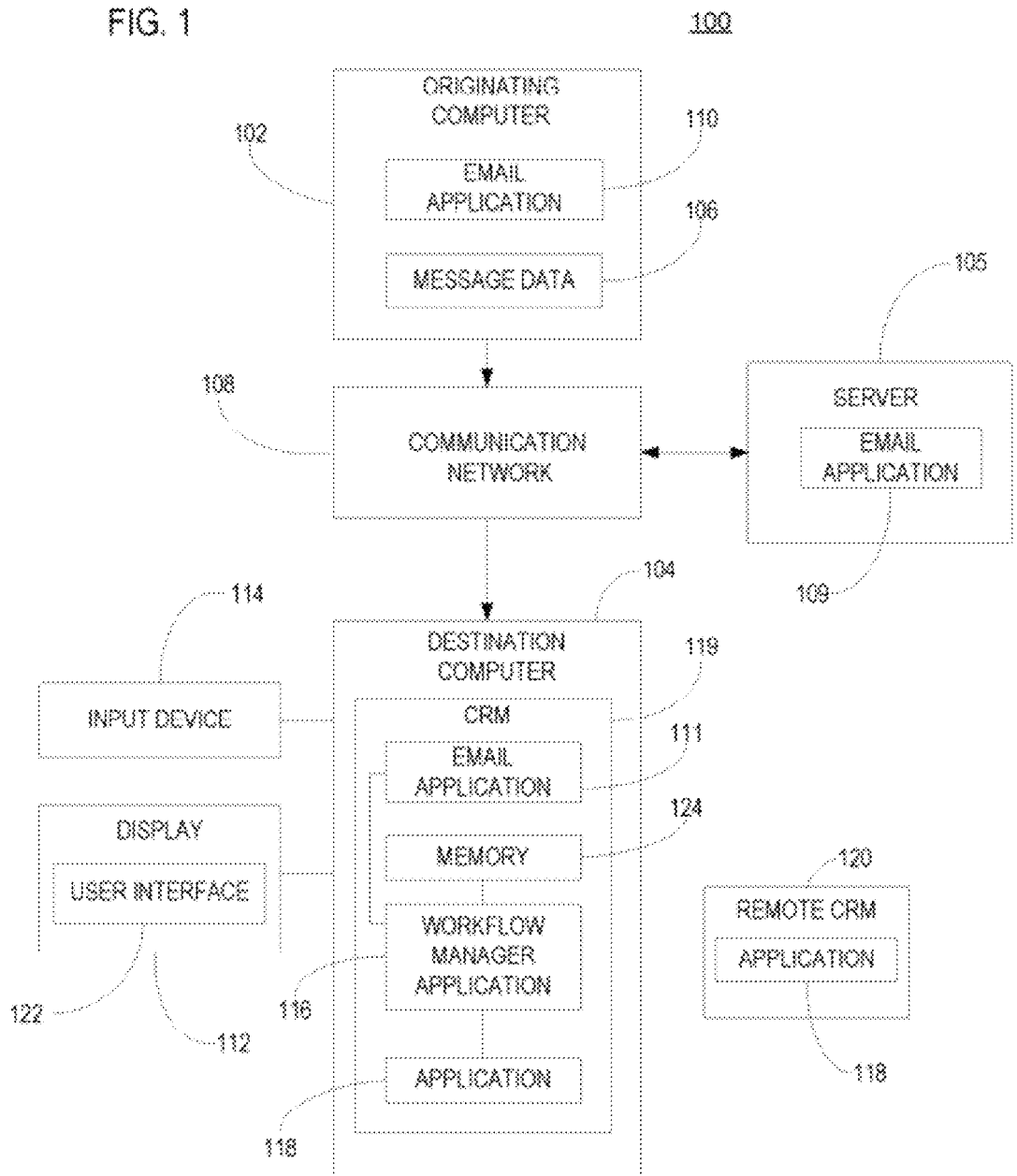

FIG. 2B 218 216

From: Jane Smith (mailto:JSmith@JanesAuto.com)
Sent: Monday, December 21, 2005 9:30 AM
To: John Smith [JSmith@someserver.com]
Subject: RE: Manufacturing Specs for Vehicle Hello Mr. Smith:

We have reviewed your order form, and we need additional information regarding the desired color of the vehicle.. In particular, a particular color of red must be specified from "Forest Red", "Pearl Red", or "Crimson" for the exterior color of the vehicle.

Sincerely,
Jane

Original Message
From: John Smith [mailto:JSmith@someserver.com]
Sent: Monday, December 14, 2005 7:53 PM
To: Jane Smith (Janes Auto)
Subject: Manufacturing Specs for Vehicle Mrs. Smith:

I have completed the attached order form regarding the BMW we discussed last week.

John Smith

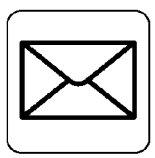
Attachment

JANE'S AUTOS

NAME
STREET
CITY
STATE

INTERIOR COLOR
EXTERIOR COLOR
VEHICLE MODEL
VEHICLE SERIES

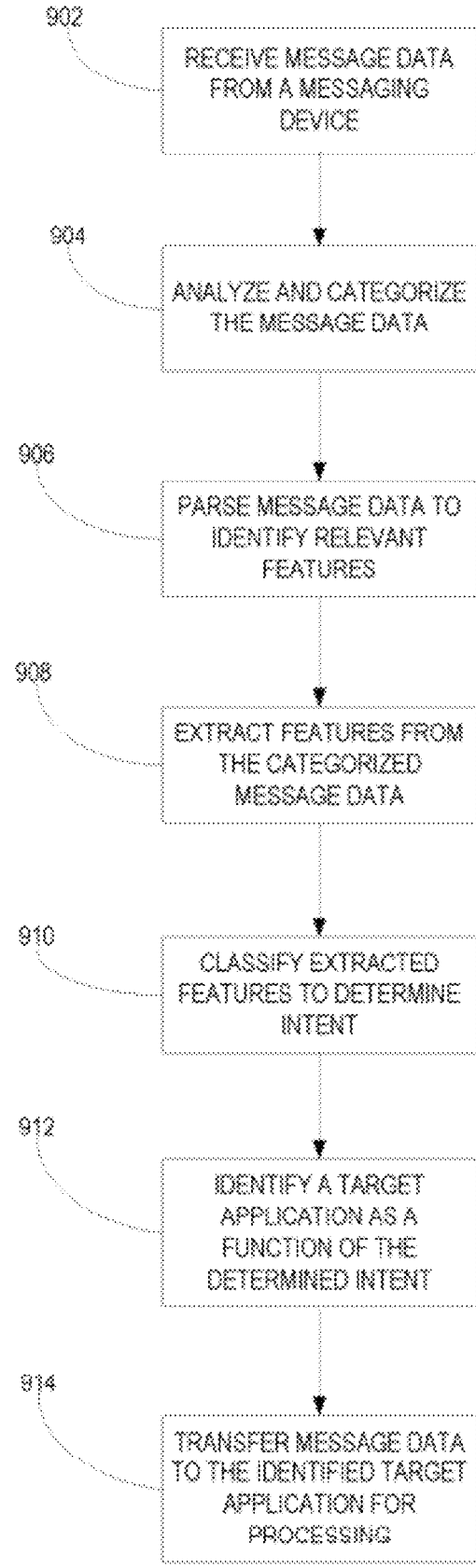

MESSAGE DATA MANAGEMENT

CROSS-REFERENCE TO RELATED APPLICATION

This application is a continuation of commonly assigned U.S. patent application Ser. No. 11/354,368, filed Feb. 15, 2006, which is a continuation-in-part of U.S. patent application Ser. No. 10/867,626, filed Jun. 15, 2004, which claims the benefit of U.S. Provisional Patent Application Ser. No. 60/549,075, filed Mar. 1, 2004, the entire disclosures of which are incorporated herein by reference.

BACKGROUND

With the growth of computer and information systems and related network technologies such as wireless and Internet communications, ever increasing amounts of electronic information are communicated, transferred and subsequently processed by users and/or systems. As an example, electronic mail, text messaging, facsimile transmission, and voice mail are all popular methods for communicating such information. In particular, with the advent of the Internet, exchanging email has become an important factor influencing why many people acquire computers. Within many corporate environments, email has become almost a de facto standard by which co-workers exchange information. However, with the heightened popularity of email and other information transfer systems, efficiency problems have begun to appear with regard to managing and processing increasing amounts of information from a plurality of sources.

One such problem involves redundant data entry. In other words, it is common for users to re-key, or re-enter, the same message data when transferring specific business function data through email. For example, a bank customer and bank loan representative can use email applications to define and communicate information regarding the terms and/or approval status of a loan application. After loan approval the bank loan representative is often required to enter the application information into a separate application used to initiate the actual loan process. Another problem many users face is the deluge of email and/or other information from which to sort through and/or respond, such that the capability of being able to send, receive, and process information has almost become a hindrance to being productive. For example, it is not uncommon for some users to receive more than one hundred email messages a day. With such large amounts of email and other electronic information, it has become difficult to manage information according to what is important and what is not as important without substantially expending valuable time to make personal determinations as to the importance. As an example of these determinations, users may have to decide whether messages should be responded to immediately, passed over to be read at a later time, or simply deleted due to non-importance (e.g., junk mail). This is particularly true because message traffic represents a wide range of content (i.e., personal, calendar, business function specific, and the like) and cannot be controlled with appropriate granularity.

Attempts have been directed at resolving information management problems. For example, attempts have been made to curtail the amount of junk or promotional email (e.g., spam) that users receive. Additionally, some electronic mail applications provide for the generation of rules that govern how email is managed within the program. For example, a rule providing, "all emails from address X" are to be placed in a special folder. Such attempts generally are not directed at the basic problem behind email and other information transfer/reception systems. That is, conventional systems often cause users to manually peruse and check at least a portion of some if not all of their received messages in order to determine which messages should be reviewed and/or contain data that requires further processing. As described above, this takes time from more productive activities. Thus, with the large quantities of information being received, there is a need for a systems and methodologies to facilitate efficient processing of electronic information while mitigating the costs of manual interventions associated therewith.

SUMMARY

Aspects of the invention allow users to selectively transfer message data to one or more applications for processing and archiving. One aspect of the invention provides a user interface that allows users to view and designate one or more applications for processing the message data. Other aspects of the invention involve analyzing message data to identify the one or more applications for processing the message data. Accordingly, the need to manually reenter received message data into an application, in which processing of the data is desired, is effectively eliminated. In addition, messages can be categorized to a specific application and, thus, reduce inbox triage load.

Computer-readable media having computer-executable instructions for transferring message data embody further aspects of the invention. Alternatively, embodiments of the invention may comprise various other methods and apparatuses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 1 is a block diagram illustrating one example of a suitable computing system environment in which the invention may be implemented.

FIG. 2B is an exemplary screen shot of an email thread including the message data of FIG. 2A.

FIG. 3B is an exemplary screen shot of a form for defining structured data.

FIG. 9 is an exemplary flow chart illustrating a method for transferring message data to a target application utilizing the workflow manager of FIG. 5

Corresponding reference characters indicate corresponding parts throughout the drawings.

DETAILED DESCRIPTION

Figure 2A:
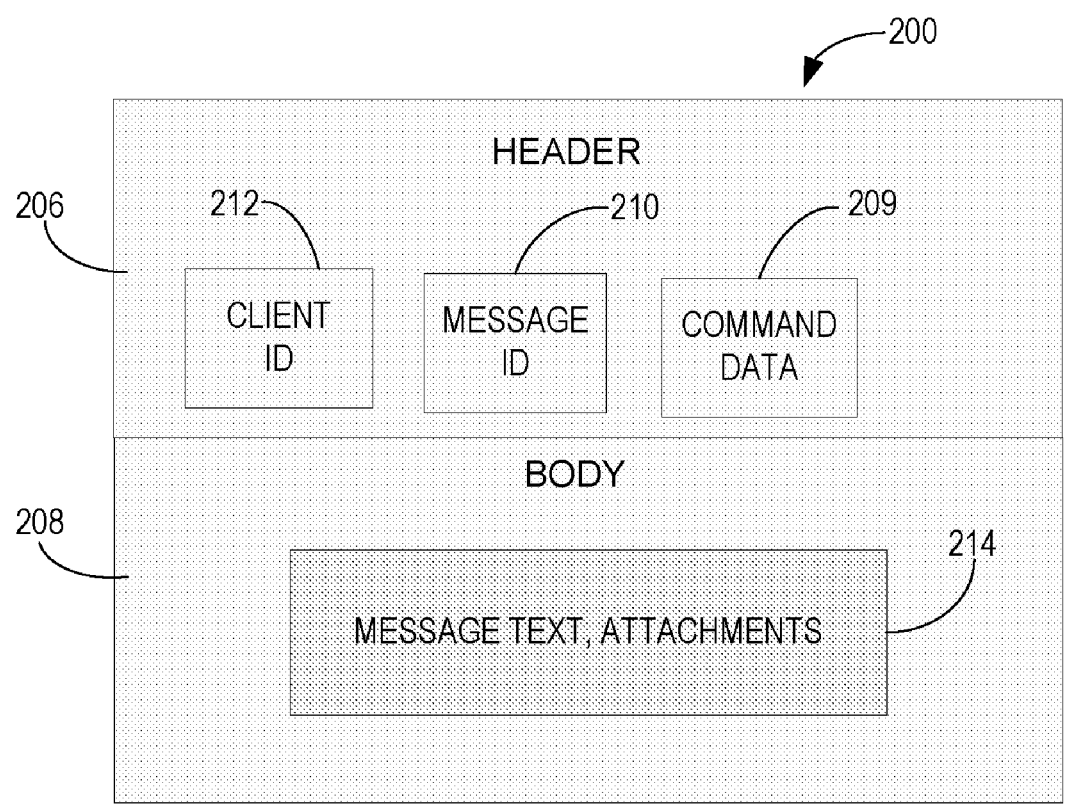
FIG. 2A illustrates components of an exemplary email message containing message data according to an embodiment of the invention.

Referring first to FIG. 1, an exemplary block diagram illustrates a suitable operating environment 100 in which aspects of the invention may be implemented. In this instance, FIG. 1 diagrammatically shows cross network communication between a messaging device and a computing device. Such messaging devices provide users with the ability to generate electronic message data (message data) for transfer to one or more computing devices. For example, the messaging device can be a computer, a cellular phone, a fax machine, or any other device, or combination of devices, used to generate and transmit electronic information via a communication network. Accordingly, such message data can include email data, voice mail data, text message data, facsimile data, etc., and can be provided as one or more data bursts, a data stream, and a plurality of data packets. Moreover, the message data can be encrypted, encoded, compressed, and/or modulated within an envelope. For purposes of illustration, aspects of the invention are described in the context of an originating computer 102 communicatively linked to a destination computer 104 such that email message data 106 can be exchanged between the originating and destination computers 102, 104 in the example of FIG. 1.

The originating computer 102 is coupled to the destination computer 104 via a data communication network 108. In this example, the communication network 108 is the Internet (or the World Wide Web). However, the teachings of the invention can be applied to any data communication network.

In turn, the originating computer 102 communicates with one or more remote destination computers 104 (e.g., sends email) or accesses the one or more servers 105 via network 108. The originating and destination computers 102, 104 execute email applications 110, 111, respectively, for sending and receiving message data 106, respectively, via the communication network 108. In this example, server 105, originating computer 102 and destination computers 104 communicate data among themselves using the Hypertext Transfer Protocol (HTTP), a protocol commonly used on the Internet to exchange information between clients and servers, or the Simple Mail Transfer Protocol (SMTP) commonly used for sending email from an originating client to a destination computer 104. A user of the originating computer 102 executes the email application 110 to compose an email message for delivery to a particular recipient. The server 105 includes an email server application 109 that receives the email message and stores the email message until the addressee (e.g., recipient) retrieves it via the destination computer 104. The email application 111 is responsive to user input (e.g., recipient) to display message data 106 received from the originating computer 102 via a graphical display 112 linked to the destination computer 104. For example, a user can enter commands and information into the computing device through an input device 114 such as a keyboard (e.g., wired or wireless) or a pointing device (e.g., a mouse, trackball, pen, or touch pad) to interact with the email application 111 to view the contents of a particular email message. As described above, the email message can include message data 106 that the user would like to process via another application.

Referring briefly to FIG. 2A, a block diagram illustrates components of an email message 200. As known to those skilled in the art, an email message 200 generally has two parts, a header 206 and a body 208. The header 206 of the email message 2000 includes, for example, Simple Mail Transfer Protocol (SMTP) command data 209 that instructs the mail server (e.g., server 105) to perform a specific action. For example, the header 206 of the email message 200 includes a "RCPT TO" command followed by one or more addresses specifying a location of one or more destination mailboxes (e.g., address of recipient), assessable via the communication network 108, at which to deliver data 214 included in the body 208 of the email message 200. The header 206 also includes message identification (message ID) 210 data identifying unique message data included in the email message and client identification (client ID) 212 data identifying a particular client sending the web request. The body 208 of the email message 200 can include text as well as attachments such as word processing documents, spreadsheets, sound files, snapshots and/or database files. As known to those skilled in the art, the data included in the header 206 and body 206 of an email message 200 is generally referred to as unstructured data even though email headers contain structured metadata. However, some attachments such as database files include structured data. As described in more detail below in reference to FIG. 3A, structured data generally refers to information that has been organized to allow identification and separation of the context of the information from its content.

Referring now back to FIG. 1, in accordance with one aspect of the invention, a workflow manager application (WMA) 116 executed on the destination computer 104 discerns the difference between structured data and unstructured data included in a received email message 200 and processes the structured and unstructured data accordingly. More specifically, the WMA 116 is responsive to structured message data included in the email message 200 to identify a target application 118 for processing the received structured message data and is responsive to unstructured message data included in the email message 200 to identify and track email threads. FIG. 2B is an exemplary screen shot of an email thread 216. As known to those skilled in the art, an email thread 216 is a series of email messages that include human readable data related to a particular topic or subject. For example, after a recipient receives an email message 200 from a particular sender, the recipient can send a reply email message 218 to the sender to add and/or edit message data 106 included in the sender's original email message 200. Alternatively, the recipient can forward the email message 200 to a different recipient. This dialog between senders and recipients produces a series of email messages, or email thread 216.

In one aspect of the invention, the WMA 116 is responsive to user input to transfer received message data 106 to one or more target applications 118 for processing. A target application 118 can be a word processing application, scheduling application (e.g., electronic calendar), a database management application or any other application or file in which processing of the received message data 106 is desired. The target application 118 can be executed from a computer readable medium (CRM) 119 of the destination computer 104 or located on a remote CRM 120 linked to the destination computer 104. After viewing the received message data 106 via the graphical display 112, the user uses the input device 114 (e.g., mouse) to interact with a user interface 122 on the display 112 to transfer the received message data 106 to a particular target application 118, or target applications, for processing.

According to another aspect of the invention, the WMA 116 automatically analyzes received message data 106 and compares the analyzed message data 106 to, for example, training data stored in a memory 124 to determine an intent of the received message data 106, and further identifies one or more target applications 118 for processing the received message data 106 as a function of the determined intent. By allowing a user to transfer received message data 106 to a target application 118 with, for example, a click of a mouse, or automatically transferring received message data 106 based on a determined intent, aspects of the invention effectively eliminate the need for a user to manually reenter such message data 106 into a desired application for processing. Although the WMA 116 application is described herein as being executed on the destination computer 104, it is contemplated that the WMA 116 can be executed on the originating computer 102 to transfer message data 106 to one or more target applications 118.

The exemplary operating environment illustrated in FIG. 1 includes a general purpose computing device (e.g., computing device 104) such as a computer executing computer-executable instructions. The computing device typically has at least some form of computer readable media (e.g., CRM 119). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through the input device 114. Other input devices (not shown) may be connected to the computing device. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Figure 3A:
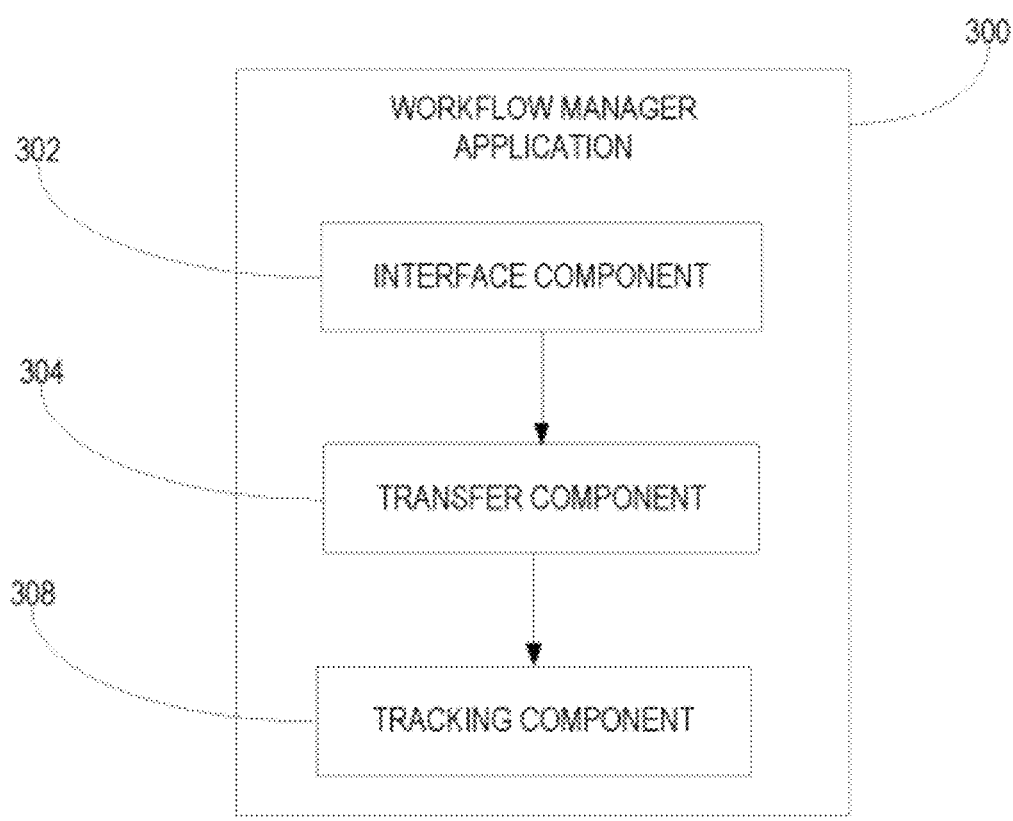
FIG. 3A is an exemplary block diagram illustrating components of a workflow manager application for implementing aspects of the invention.

Referring now to FIG. 3A, an exemplary block diagram illustrates basic components of a WMA 300 (e.g., WMA 116) for implementing aspects of the invention. An interface component 302 is responsive to the received message data 106 to display a graphical user interface (e.g., UI 122) that allows the user to view the received message data 106 and one or more target applications 118 for processing the received message data 106 (see FIG. 4). Moreover, the interface component 302 is responsive to user input selecting one or more of the displayed target applications 118 via the graphical user interface 122 to define one or more target applications 118. A transfer component 304 transfers the message data 106 to the defined one or more target applications 118 for processing. For example, the transfer component 304 identifies one or more target applications 118 based on structured message data included in the message data 106. As described above in reference to FIG. 2, structured data is information that has been organized to allow identification and separation of the context of the information from its content, and includes metadata tags that indicate the purpose of a particular piece of data. For example, assume a customer interested in purchasing a particular vehicle from a dealer downloads an electronic order form from the dealer's web site. FIG. 3B is an exemplary screen shot of such an order form 306 created in an Extensible Markup Language (XML) format. The form includes various data entry fields for defining customer information and desired manufacturing specifications. After completing the form 306, the customer submits the form 306 to the dealer as an attachment in an email message 200 (see FIG. 2B). The following is an example of structured data corresponding to customer information and manufacturing specifications for a new vehicle included in a completed order form 306:

```
<customer-information>
    <customer-name>John Smith<customer-name>
    <area>
        <city>Seattle<city>
        <state>WA<state>
        <dealer>Jane's Autos<dealer>
    <manufacturing-specifications>
    <colors>
        <exterior>red<exterior>
        <interior>tan<interior>
    <vehicle type>
        <model>BMW<model>
        <series>325i<series>
```

In this example, a customer, John Smith, sends an email message to the dealer, Jane's Autos, that includes structured data defining desired specifications for a new vehicle. The dealer views the specification information included in the email via the UI 122. After viewing the desired specifications, the dealer may interact with the UI 122 to select an internal manufacturing database file as the target application 118. The transfer component 304 is responsive to the dealer's input selecting the internal database file to query the structured data to identify the data type and corresponding content, and to transfer the identified content to corresponding data fields in the internal manufacturing database file for storage and/or processing.

A tracking component 308 identifies email threads 216 based on unstructured message data included the received email message data 106. For example, the tracking component 308 can identify an email thread 216 based on subject data included in the header 206 of the email message data 106. When composing an email message 200, the original sender generally defines a subject or a topic for the email in a subject line field (e.g., Manufacturing Specs for Vehicle). When the email message is sent to the recipient, the defined subject or topic is included as message data in the header (e.g., header 206). However, when replying, the recipient generally does not define subject data. Rather, the SMTP protocol inserts an indication that the email is a reply email message (e.g., reply email message 218) by, for example, inserting a "RE:" prefix to the subject data (e.g., RE: Manufacturing Specs for Vehicle). Notably, the tracking component can identify email threads 216 from other unstructured data included in the email message. By identifying email threads 216, the WMA 300 also allows a user to transfer any updated message data to the target application 118 for processing. The tracking component 308 creates and updates a thread tracking log that is stored in a memory (e.g., memory 124). The thread tracking log identifies the name of the target application 118 defined by the user via a graphical user interface (e.g., GUI122), or automatically defined by the WMA (See FIG. 5), for processing structured message data associated with each email message in the email thread 216. For example, Table I below shows an exemplary thread tracking log that stores target application information associated with structured data in an e-mail thread 216 regarding the above example of a customer purchasing a vehicle.

TABLE I

SUBJECT: MANUFACTURING SPECIFICATION FOR VEHICLE

| THREAD NUMBER | DEFINED TARGET APPLICATION |
|---|---|
| 1 | INTERNAL MANUFACTURING DATABASES.EXE |
| 2 | INTERNAL MANUFACTURING DATABASES.EXE |
| 3 | INTERNAL MANUFACTURING DATABASES.EXE |

In this example, the thread number column refers to the transmission sequence of each email in an email thread regarding the desired manufacturing specifications. That is, each thread number corresponds to the chronological order in which the corresponding email message in the email thread 216 was transmitted. For example, the first thread (i.e., thread number 1) is an original email message from John Smith to Jane's Autos, the second thread (i.e., thread number 2) is a first reply email from Jane's Autos to John Smith, and the third thread (i.e., thread number 3) is a second reply email from John Smith to Jane's Autos. In this particular example, the same target application was defined for each thread.

The tracking component 308 also compares structured data associated with the most recent email message in an email thread (e.g., thread number 3 in Table I) with a version of structured data associated with the next most recent email message in the email thread (e.g., thread number 2 in Table I) to determine if the structured data associated with the most recent email message has been updated or modified.

The interface component 302 is responsive to updated or modified structured data to display graphical user interface (e.g., UI 122) that allows the user to view the received message data 106 and the name of the target application 118 previously defined for processing the received message data 106. The interface component 302 is responsive to user input selecting, for example, an OK control displayed via the graphical user interface to define the previously defined target application as the current target application 118 for processing modified structured data included in the email thread 216. The transfer component 304 is responsive the defined target application to transfer the modified structured message data to the target application 118 for processing.

Referring again to the example of a customer interested in purchasing a particular vehicle from a dealer described above, assume the dealership (original recipient) sends a reply email message to the customer (original sender) that a particular color of red must be specified from "Forest Red", "Pearl Red", or "Crimson" for the exterior color of the vehicle. The customer again interacts with the order form to define "Forest Red" as the desired exterior color. After revising the form, the customer submits the form to the dealer as an attachment in a reply email message to the dealer's reply email message. The following is an example of structured data corresponding to customer information and manufacturing specifications for a new vehicle included in the revised order form:

```
<customer-information>
    <customer-name>John Smith<customer-name>
    <area>
        <city>Seattle<city>
        <state>WA<state>
        <dealer>Jane's Autos<dealer>
    <manufacturing-specifications>
    <colors>
        <exterior>forest red<exterior>
        <interior>tan<interior>
    <vehicle type>
        <model>BMW<model>
        <series>325i<series>
```

In this case, the only modification to the structured data is the exterior color of the vehicle. The interface component 302 is responsive to the modified structured message data 106 to display a graphical user interface that allows the user to view the received message data 106 and the previously defined target application (e.g., the internal manufacturing database file) for processing the structured data. If the dealer accepts (e.g., clicks an OK control), the internal manufacturing database file is defined as the current target application 118. The transfer component 304 is responsive to defined target application to query the structured message data to identify the data type and corresponding content of updated structured data, and to transfer the updated content to corresponding data fields in the internal manufacturing database file for storage and/or processing.

Figure 4:
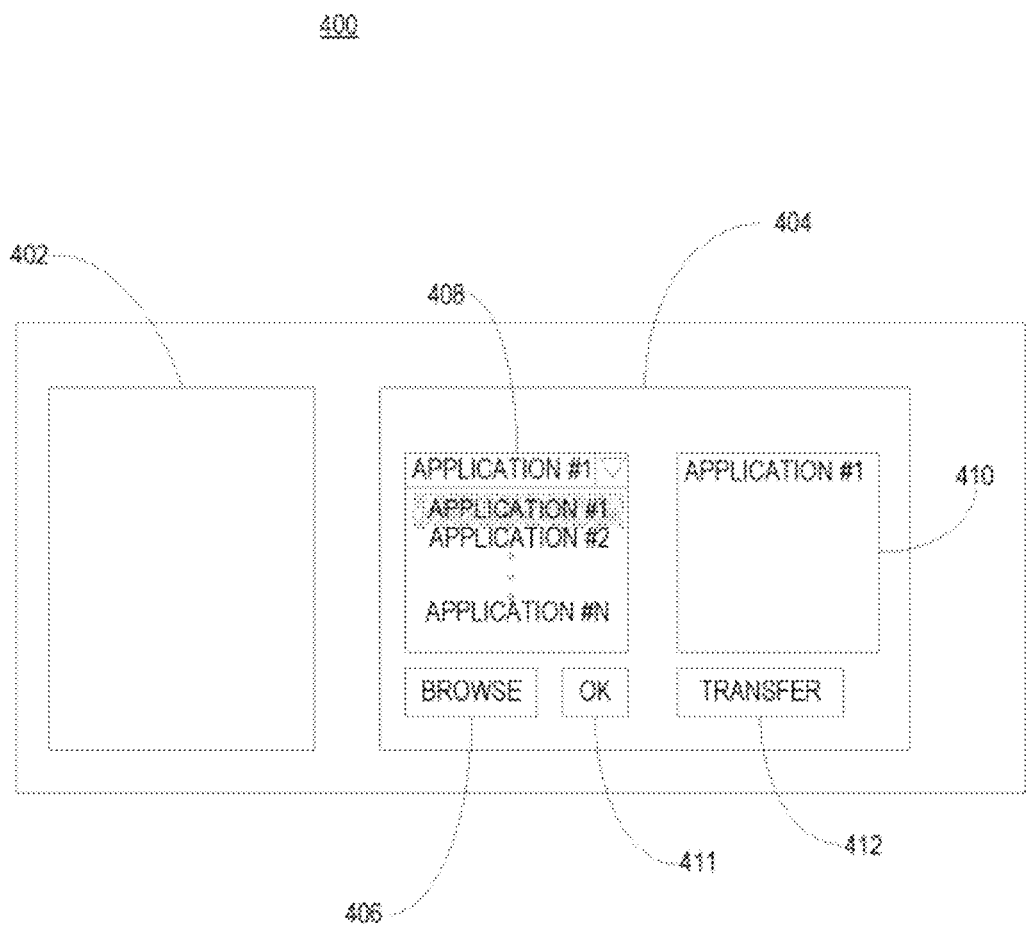
FIG. 4 is a block diagram illustrating an exemplary graphical user interface for viewing and/or transferring message data.

Referring now to FIG. 4, a screen shot illustrates an exemplary graphical user interface 400 that allows the user to view received message data 106 and/or select a target application 118 for processing the received message data 106. In this particular embodiment, the graphical user interface 400 includes a message data window 402 for displaying the received message data 106 and a target application menu 404 for displaying and selecting target applications 118. The message data window 402 displays, for example, message data 106 associated with an email message 200. After reviewing the received message data 106 in the data window 402, the user interacts with the target application menu 404 to designate or define one or more target applications for processing the message data 106. Notably, the WMA 200 may be integrated with an email application (e.g., email applications 110, 111) such that the message data window 402 appears as a standard email window displaying received message data 106.

The target application menu 404 is responsive to user input to display applications stored on the computer (e.g., destination computer 104) executing the workflow manager application 200 or stored on a remote computer readable medium. For example, the target application menu 404 includes a browse control 406 that allows the user to search a local computer readable medium (e.g., CRM 119) or a remote computer readable medium (e.g., CRM 120) to identify one or more target applications 118 for processing the received message data 106. The target application menu 404 includes a drop down list box 408 for displaying application file names in response to the user selecting the browse control 406, and a list box 410 for displaying selected target applications 118. Thereafter, the user uses the input device 114 (e.g., mouse) to select (e.g., double click) one or more of the application file names in the drop down list box 408 to add to the list box 410. Alternatively, the user uses the input device 114 to highlight (e.g., single mouse click) one or more of the application file names displayed in the drop down list box 408, and then uses the input device 114 to select an OK control 411 to add the highlighted one or more application file names to the list box 410. If the user has previously defined a target application for processing structured data (e.g., structured data associated with an email thread), the target application menu 404 will display the previously defined target application in the list box 410. A transfer control 412 is responsive to user input (e.g., mouse click) to transfer the received message data 106 to the one or more target applications 118 in the list box 408. Notably, as described above, the WMA 200 may be integrated with an email application (e.g., email applications 110, 111) such that the user selects a workflow manager icon (not show) displayed in a tool bar (not shown) of the email message window to view the target application menu 404.

According to another aspect of the invention, the transfer control 412 corresponds to a predetermined target application 118. That is, the transfer control 412 includes parameter data, or property data, that defines a target application 118 for processing the received message data 106. The interface component 202 is responsive to a user selecting the transfer control 412 to transfer the received message data 106 the predetermined target application 118 to perform a particular business function using the received message data 106. For example, the target application can schedule a meeting based on the received data, prepare contracts based on the received message data 106, transfer the received message data 106 to a database for storage, and/or notify a next approval level of the message data 106.

Referring back to FIG. 3A, according to yet another aspect of the invention, the transfer component 304 is responsive to the received structured message data 106 and user input to automatically identify one or more default target applications 118 for processing. For example, if the user has not defined a target application by selecting one or more of the displayed target applications 118 via the graphical user interface, the transfer component 304 can transfer the message data 106 to the default target application 118. As an example, if the message data 106 includes file data such as a file name, the transfer component 304 identifies the extension portion of the file name and transfers the message data 106 to an application that processes and/or creates files with the same extension. As another example, if the message data 106 includes text data such as words, sentences, and phrases, the transfer component 304 analyzes the text data, such as described in more detail in reference to FIG. 5 below, to identify key words associated with a particular target 118.

Figure 5:
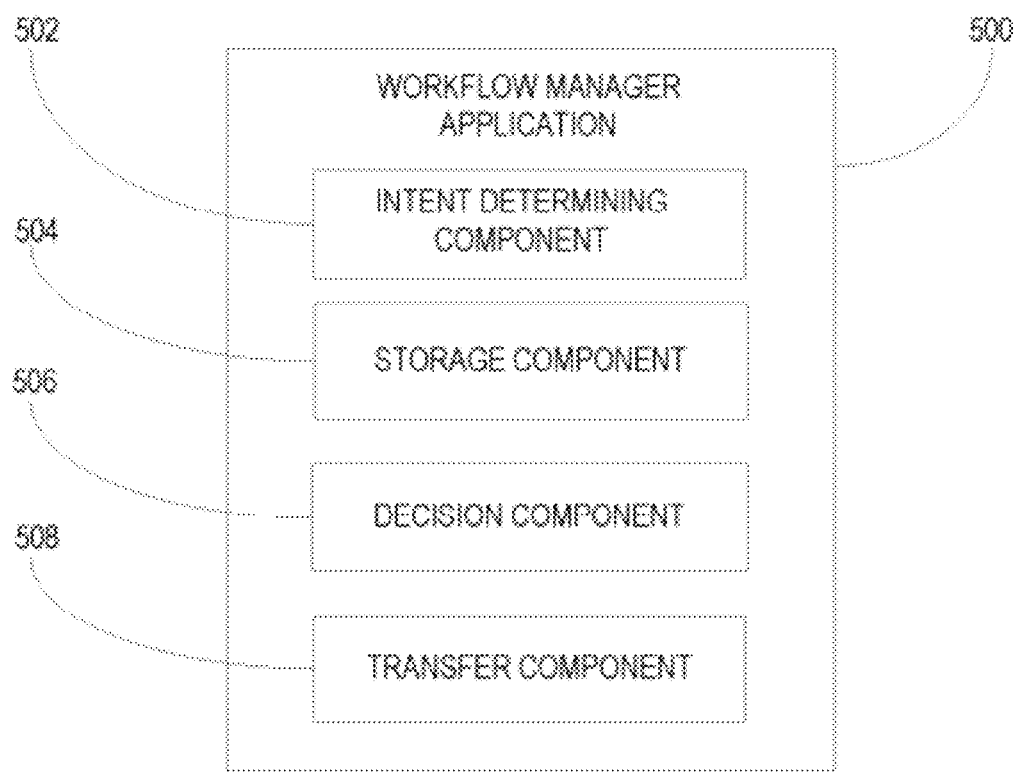
FIG. 5 is an exemplary block diagram illustrating components of a workflow manager application for implementing further aspects of the invention.

Referring now to FIG. 5, an exemplary block diagram illustrates basic components of a WMA 500 (e.g., WMA 116) in accordance with one aspect of the invention. An intent determining component 502 receives message data 106 such as email, messages, documents, audio, graphics, etc., and determines the intent of the received message data 106. For example, the intent determining component 502 determines the intent of received message data 106 by calculating a transfer probability that the received message data 106 is intended to be transferred to a particular application for processing.

A storage component 504 stores the received message data 106 in a memory (e.g., memory 124). The message data 106 can be utilized to generate statistics and/or training sets, and to facilitate data error checking and error recovery. Moreover, upon determining the intent of the message data, the storage component 504 stores the determined intent (e.g., calculated transfer probability) to memory 124.

A decision component 506 determines whether the determined intent corresponds to a desire to transfer message data 106 to a particular target application (e.g., default application). For example, the decision component 506 determines whether to transfer message data 106 to one or more applications by comparing a calculated transfer probability (e.g., intent) for each of a plurality of applications stored in memory 124 to a corresponding threshold probability value stored in memory 124 for each of the plurality of applications. In other words, if the determined probability exceeds a particular stored threshold value, the decision component 506 defines the corresponding application as a target application 118. The threshold value can be user defined, default and/or automatically set based on past user responses. In addition, the threshold value can be manually and/or automatically adjusted in real-time (dynamically) to adapt to various users and/or circumstances. Moreover, the threshold value can be set based on inferences, predictions, probabilities, etc.

If all the determined probabilities are less than the corresponding threshold values, no further action is taken by the WMA 500. However, if at least one of the determined probabilities for an application is greater than a corresponding threshold value, the decision component 506 defines that application as the target application 118. The transfer component 508 is responsive to the defined target application 118 to transfer the received message data 106 to the target application 118 for processing.

Figure 6:
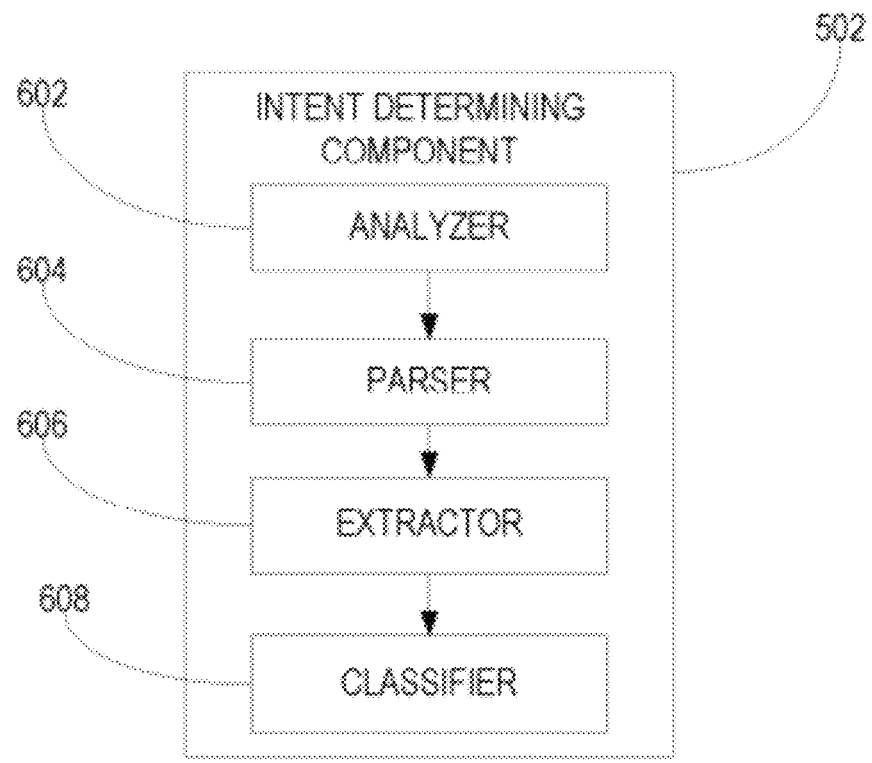
FIG. 6 is an exemplary block diagram illustrating components of an intent determining component for implementing aspects of the invention.

Referring now to FIG. 6, an exemplary block diagram illustrates basic components of the intent determining component 502 in accordance with one aspect of the invention. An analyzer 602 scrutinizes and categorizes the data (e.g., segregates into respective bins). Such categorization includes distinguishing between header, body, salutation, etc. The analyzer 602 can categorize the data based on metadata, location of a subset of data (e.g., structured data) within the data, content, context, keywords, history, heuristics, inferences, rules, demarcations, extrinsic information such the source of the data, the time of day and/or day of week the data was transmitted and/or received, cost/benefit of handling the data, etc.

A parser 604 scrutinizes the categorized data and separates the data into logical structures such as strings, words, sentences, paragraphs. Similar to the analyzer 602, the parser 604 utilizes information such as metadata, location of the set of data within the data, content, context, keywords, history, heuristics, inferences, rules, demarcations, and/or day of week the data was transmitted and/or refine decision granularity.

An extractor 606 extracts features from the categorized data. The extracted features are conveyed to a classifier 608 to determine intent. Extracted features can be links and URLs, key words, file name extensions, structured data, etc. As described above, the intent can be intent to do something or nothing. For example, if the message data includes a document having a file name. The extractor 606 may extract extension portion of the file name and the classifier 608 may determine that the intent is to transfer the message data to an application that processes and/or creates files with the same extension. As another example, if the extractor extracts message data such as "schedule," "meeting," and "available," the classifier 608 may determine that the intent is to transfer the message data to a scheduling or appointment application. The classifier 608 compares extracted features to training set data to determine the intent of such extracted features. Training sets can be manually and/or automatically generated and utilized during training-time to train the classifier 608. In addition, the classifier 608 can be dynamically updated during run-time. In one aspect of the invention, the training sets at least include information related to data properties and linguistic structure. Thereafter, the determined intent is provided to the decision component 506 (see FIG. 5), which compares the determined intent (e.g., probability) with a threshold value for one or more applications to identify target applications for processing the message data 106. It is to be appreciated that the classifier 608 can be any classifier such as a Support Vector Machine, Bayesian, or knowledge-engineered classifier.

Figure 7:
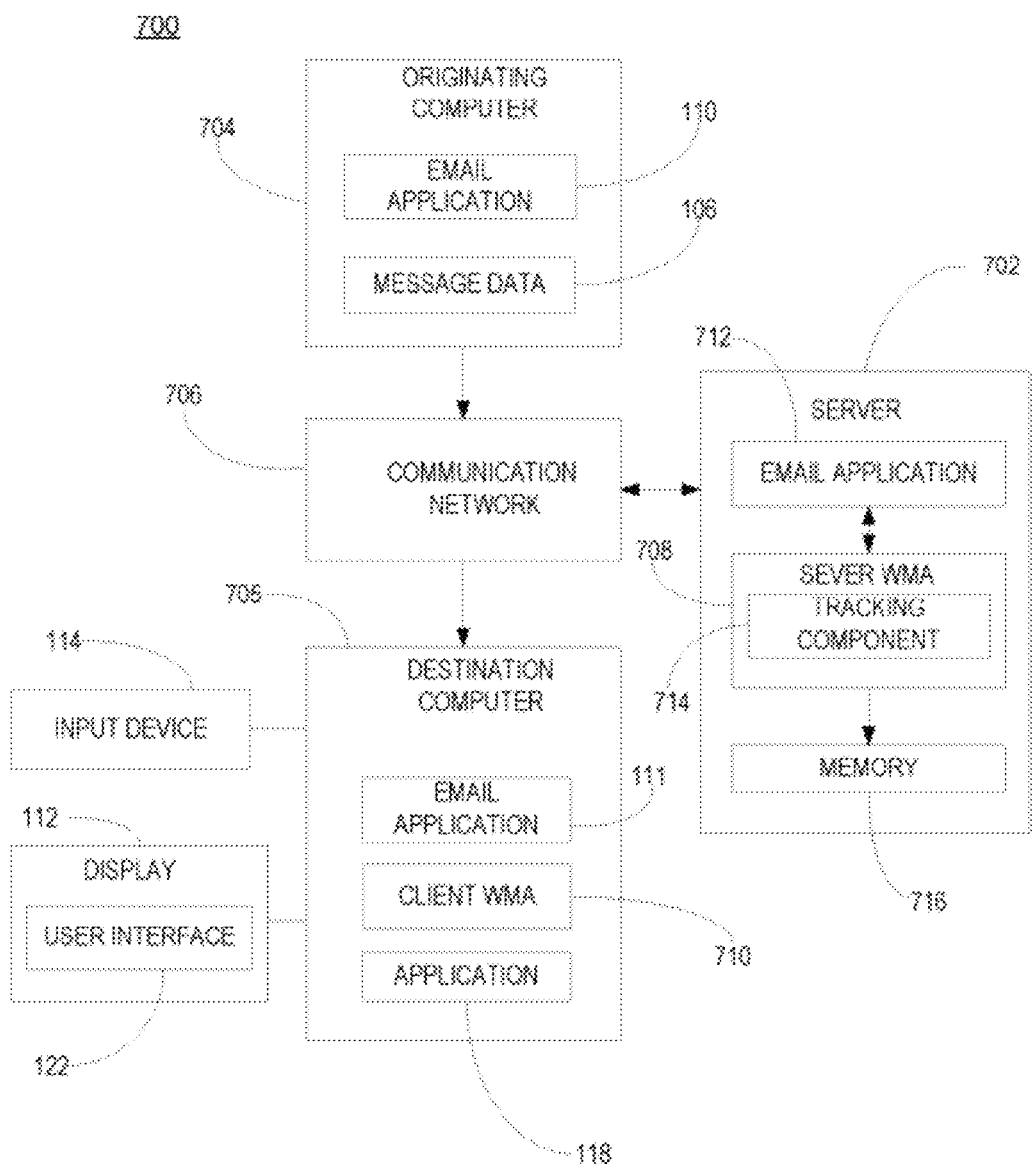
FIG. 7 is an exemplary block diagram illustrating components of a workflow manager application for implementing further aspects of the invention.

FIG. 7 illustrates another suitable operating environment 700 in which aspects of the invention may be implemented. In this particular embodiment, a mail server 702 is coupled to an originating computer 704 and a destination computer 705 via a communication network 706. The server 702 is configured for executing a server work flow manager application (sever WMA) 708 and the destination computer 705 is configured for executing a client work flow manger application (client WMA) 710. The server 702 includes an email server application 712 that receives the email message and stores the email message until the addressee (e.g., recipient) retrieves it via the destination computer 705. As known to those skilled in the art, such email server applications can maintain a list of email messages in an electronic inbox accessible by the recipient. The recipient can view the list email message in the inbox from any client computer configured for accessing that particular email server application 712. The server WMA 708 is responsive to unstructured message data included in the received email message 200 to identify and track email threads.

The WMA 708 includes a tracking component 714 that identifies email threads based on unstructured message data included the received email message 200. For example, the tracking component 714 operates the same as the tracking component 308 described above in reference to FIG. 3A and identifies an email thread based on subject data included in the header of the email message data 106. The tracking component 714 communicates with the client WMA 710 on the destination computer 705 to receive and/or transfer target application 118 information for processing structured data included in email threads. More specifically, the target application 118 retrieves selected target applications from the client WMA 710 to create a thread tracking log(see TABLE I) for storage in a memory 716 of the server 702. As described above, the thread racking log identifies the name of the target application 118 defined by the user graphical user interface 122, or automatically determined by the WMA (See FIG. 5), for processing structured message data associated with each email message in the email thread. Generally, client WMA 710 operates substantially the same as to the WMA 300 described above in connection with FIG. 3A and allows the user to view message data 106, selectively or automatically transfer structured message data to target application 118 for processing, and track email threads locally (i.e., track email threads on a particular destination computer.) However, by creating and storing thread tracking logs in a memory 716 on the server 702, the recipient can access the thread log from various destination computers, and can transfer any updated structured message data to the target application 118 for processing. Moreover, the tracking component 714 can issue an alert or indication to the user that structured message data associated with the most recent email message in an email thread has been updated or modified by flagging that particular email message in the recipient's inbox. That is, the tracking component 714 compares structured data associated with the most recent email message in an email thread with a version of structured data associated with the next most recent email message in the email thread to determine if the structured data associated with the most recent email message has been updated or modified. Thus, when the tracking component 714 determines that the most recent email message in the email thread has been modified, the tracking component issues a command to the email application to flag that particular email message in the recipient's inbox.

Figure 8:
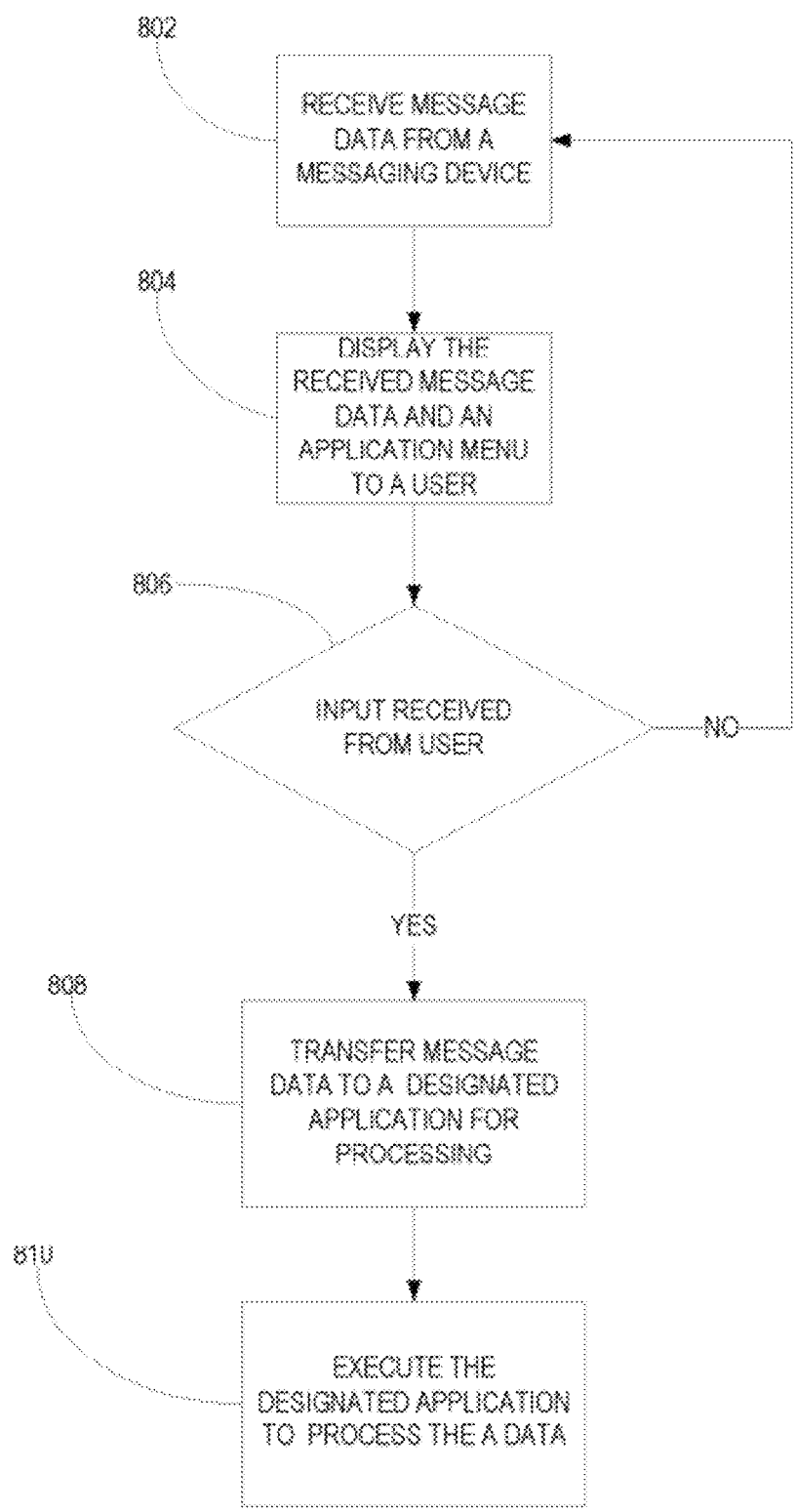
FIG. 8 is an exemplary flow chart illustrating a method for transferring message data to a target application utilizing the workflow manager of FIG. 3A.

Referring now to FIG. 8, an exemplary flow chart illustrates a method for transferring message data to a target application according to the aspect of the invention described above in referenced to FIG. 3A. Message data is received from the originating computer 102 at 602. At 804, the WMA 116 displays received message data and an application menu to the user via a graphical user interface 122. The application menu allows the user to designate a target application for processing the received message data. At 806, the WMA 116 is responsive to user input to transfer the message data to the designated application for processing. For example, the menu presented at 804 displays a transfer control (e.g., transfer control 412) and list of applications for processing message data, and the WMA 116 is responsive to the user selecting at least one of the applications from the list of applications and the transfer control 412 to transfer message data to the selected application 808. Alternatively, if the user does not select any of the applications at 806, the WMA 116 waits to receive message data at 802. At 810, the WMA 116 executes the selected application to process the received message data.

Referring now to FIG. 9, an exemplary flow chart illustrates a method for transferring message data to a target application according to the aspect of the invention described above in referenced to FIG. 5. Message data is received from a messaging device (e.g., originating computer 102) at 902. At 904, the WMA 116 analyzes and categorizes the received message data (e.g., separates into respective bins). As described above, the WMA 116 can categorize data based on metadata, location of a subset of data within the data, content, context, keywords, history, heuristics, inferences, rules, demarcations, extrinsic information such the source of the data, the time of day and/or day of week the data was transmitted and/or received, cost/benefit of handling the data, etc. The WMA 116 parses the categorized data and separates the data into logical structures such as strings, words, sentences, paragraphs at 906. At 908, the WMA 116 extracts features from the categorized data. The extracted features are classified to determine intent at 910. As described above, the intent can be represented by the probability that the intent is to transfer the message data to a particular application. At 912, the WMA 116 identifies a target application for processing the message data as a function of the determined intent. For example, the WMA 116 determines the probability that intent of the message data is to be transferred to one or more applications by comparing the determined probability to a threshold value, stored in memory, for each of a plurality of applications. The WMA 116 transfers the message data to the identified target application for processing at 914.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more non-transitory computer-readable storage media having computer executable components executed by a computing device for transferring received message data to an application for processing, wherein said message data is included in an electronic message received from a messaging device, said computer-readable storage media comprising: an intent determining component for determining an intent of the received message data; a decision component for defining a target application as a function of the determined intent; a tracking component for identifying a message thread based on the received message data, said identified message thread including at least two electronic messages each having message data, wherein the tracking component is responsive to the identified message thread for identifying a thread number for each of the at least two electronic messages in the identified message thread, said thread number corresponding to a chronological sequence in which each of the at least two electronic messages were received from the messaging device; and a transfer component for transferring the received message data to the defined target application for processing.

2. The computer-readable storage media of claim 1, wherein the intent determining component determines the intent by calculating a transfer probability that the received message data is intended to be transferred to a particular application, and wherein the computer-readable media further comprises a storage component for storing a list of applications and a corresponding threshold value for each application in of the list of applications, and wherein the intent determining component calculates the transfer probability for each application in the list of applications, and wherein the decision component compares the calculated transfer probability for each application to the corresponding threshold value for each application to define one or more target applications.

3. The computer-readable storage media of claim 2, wherein the decision component defines a particular application in the list of applications as a target application when the calculated transfer probability for that particular application is greater than the corresponding threshold value for that particular application, and wherein the transfer component transfer the received message data to that particular target application for processing.

4. The computer-readable storage media of claim 1, wherein the intent determining component includes:
    an analyzer for categorizing the received message data;
    a parser for separating the categorized message data into logical structures;
    an extractor for extracting features from the categorized and separated data; and
    a classifier for comparing extracted features to training set data to determine the intent of the extracted features.

5. The computer-readable storage media of claim 1, wherein the tracking component is further responsive to the identified message thread to create or update a thread tracking log, said tracking log:
    storing the defined target application for processing message data included in each of the at least two electronic messages included in the identified message thread; and
    storing the identified thread number for each of the at least two electronic messages.

6. The computer-readable storage media of claim 1, wherein the tracking component identifies the thread number for each of the at least two electronic messages as a function of the message data.

7. The computer-readable storage media of claim 6, wherein the tracking component compares message data included in a most recent electronic message in the chronological sequence to the message data included in a next most recent electronic message in the chronological sequence to determine if updated message data is associated with the most recent electronic message.

8. The computer-readable storage media of claim 7, wherein the transfer component is responsive to the updated message data to transfer the updated message data to the defined target application for processing.

9. A system for transferring received message data to an application for processing, wherein said message data is included in an electronic message received from a messaging device, said system comprising:
    a computer processor; and
    a computer-readable storage media having stored thereon computer processor-executable instructions, said instructions executable by the computer processor for:
        determining an intent of the received message data;
        defining a target application as a function of the determined intent;
        identifying a message thread based on the received message data, said message thread including at least two electronic messages each having message data;

identifying a thread number for each of the at least two electronic messages in the identified message thread as a function of the message data, said thread number corresponding to a chronological sequence in which each of the at least two electronic messages were received at the destination device;

transferring the received message data to the defined target application for processing;

comparing message data included in a most recent electronic message in the chronological sequence to the message data included in a next most recent electronic message in the chronological sequence to determine if updated message data is associated with the most recent electronic message; and transferring the updated message data to the defined target application for processing.

10. The system of claim 9, wherein the computer processor-executable instructions further include instructions for storing a list of applications and a corresponding threshold value for each application in of the list of applications in a memory.

11. The system of claim 10, wherein said determining an intent includes calculating a transfer probability for each application in the list of applications.

12. The system of claim 9, wherein the computer processor-executable instructions further instructions for:

comparing the calculated transfer probability for each application to the corresponding threshold value for each application to determine whether to transfer the message data to one or more a target applications; and defining a particular application in the list of applications as the target application when the calculated transfer probability for that particular application is greater than the corresponding threshold value for that particular application.

13. A computerized method for transferring received message data to an application for processing, wherein said message data is included in an electronic message received from a messaging device, said method comprising:

storing a list of applications and a corresponding threshold value for each application in of the list of applications in a memory;

determining an intent of the received message data;

defining a target application as a function of the determined intent;

identifying a message thread based on the received message data, said message thread including at least two electronic messages each having message data;

identifying a thread number for each of the at least two electronic messages in the identified message thread as a function of the message data, said thread number corresponding to a chronological sequence in which each of the at least two electronic messages were received at the destination device;

transferring the received message data to the defined target application for processing;

comparing message data included in a most recent electronic message in a chronological sequence to the message data included in a next most recent electronic message in the chronological sequence to determine if updated message data is associated with the most recent electronic message; and transferring the updated message data to the defined target application for processing.

14. The method of claim 13, said determining an intent including calculating a transfer probability for each application in the list of applications.

15. The method of claim 14, said method further comprising:

comparing the calculated transfer probability for each application to the corresponding threshold value for each application to determine whether to transfer the message data to one or more a target applications; and defining a particular application in the list of applications as the target application when the calculated transfer probability for that particular application is greater than the corresponding threshold value for that particular application.

* * * * *